United States Patent [19]

Werner et al.

[11] 4,278,290
[45] Jul. 14, 1981

[54] MOTOR-DRIVEN ADJUSTABLE SEAT, PARTICULARLY A MOTOR VEHICLE SEAT

[75] Inventors: Paul Werner, Remscheid; Willibald Strowik, Remscheid-Lennep, both of Fed. Rep. of Germany

[73] Assignee: Keiper Automobiltechnik GmbH, Remscheid, Fed. Rep. of Germany

[21] Appl. No.: 57,011

[22] Filed: Jul. 12, 1979

[30] Foreign Application Priority Data

Jul. 17, 1978 [DE] Fed. Rep. of Germany ....... 2831314

[51] Int. Cl.³ ............................................. A47C 1/025
[52] U.S. Cl. .................................... 297/362; 297/330
[58] Field of Search ............... 297/361, 362, 330, 346, 297/348; 248/419, 429, 394

[56] References Cited

U.S. PATENT DOCUMENTS 3,072,231  1/1963  Iding ................................ 248/419 X
3,223,377 12/1965  Robbins ............................. 248/419
3,423,785  1/1969  Pickles ................................ 16/140

FOREIGN PATENT DOCUMENTS 2734568  2/1979  Fed. Rep. of Germany .......... 297/362

Primary Examiner—William E. Lyddane
Attorney, Agent, or Firm—Michael J. Striker

[57] ABSTRACT

The potentiometer and reduction gear unit for use in connection with a seat adjuster driven by a servomotor and controlled by a microprocessor which recallably stores the value measured by the potentiometer, comprises a common housing assembled of two parts arranged about the driving shaft of the motor; one housing part accommodates the reduction gears and the other part supports a ringshaped resistor and a contact ring; the slider of the potentiometer bridges the contact ring and resistor ring and is frictionally coupled to the output member of the reduction gears, formed preferably as a wobble gear mechanism.

20 Claims, 5 Drawing Figures

MOTOR-DRIVEN ADJUSTABLE SEAT, PARTICULARLY A MOTOR VEHICLE SEAT

BACKGROUND OF THE INVENTION

This invention relates generally to power-driven position adjusters for motor-vehicle seats, and more specifically it relates to an adjuster of the type having a servomotor for adjusting the position of the seat, a potentiometer coupled to the servomotor via a reduction gear to generate a repeatable signal corresponding to the adjusted position of the seat, and an electronic data processing and storing device, such as a microprocessor, controlled by the potentiometer and connected for controlling the servomotor.

For adjusting the position of a motor-driven adjustable seat, it has been suggested to couple the servomotor to a potentiometer which supplies the measured partial voltage corresponding to the adjusted position of the seat to the memory of a data processing device such as for example a microprocessor. In this manner it is possible to reset exactly and automatically the initially selected position irrespective of its subsequent changes provided that the measured value pertaining to the initially set position which in this case is represented by a certain partial voltage on the potentiometer, is stored in the data processing device. Due to the fact, however, that the seat is adjustable in a predetermined range, the traverse of which normally requires a large number of rotations of the driving shaft of the motor whereas the path of the movable part of the potentiometer is relatively small, it is necessary to reduce the number of rotations of the driving shaft to match the rotation of the potentiometer. For this purpose a reduction gear arranged between the potentiometer and the driving shaft is employed. Conventional reduction gears used for this purpose require a considerable installation space and in addition are mounted on brackets or the like connected to the seat. Moreover, in many cases it is necessary to provide respectively both the reduction gears and the potentiometer with protective housings in order to separate the two units from detrimental effects of the environment.

SUMMARY OF THE INVENTION

It is, therefore, a general object of the present invention to overcome the aforementioned disadvantages.

More particularly, it is an object of the invention to provide an improved motor vehicle seat of the aforedescribed type which is repeatedly adjustable to a preselected position by an electronically controlled servomotor and in which the potentiometer together with its reduction gears occupies minimum space.

Another object of this invention is to provide improved reduction gears for the potentiometer which can be made with a very high reduction ratio without enlarging their structure.

In keeping with these objects, and others which will become apparent hereafter, one feature of the invention resides, in a seat, particularly a motor vehicle seat, having a position adjuster driven by a servomotor, a potentiometer coupled to the motor via reduction gears, and an electronic data processing and storing device electrically connected between the potentiometer and the servomotor to store and process the value measured on the potentiometer and to control via the servomotor the position of the seat, in a combination in which the reduction gear and the potentiometer are arranged in a common housing about the driving shaft of the servomotor, the reduction gear having an input member coupled to the driving shaft and an output member; and the potentiometer having a rotatable slider coupled to the output member.

In this manner the potentiometer and the reduction gears are integrated into a single structural unit having a common housing and in which coupling members between the reduction gears and the motor on the one hand and between the gears and the potentiometer on the other hand can be contained one in the other in a very space-saving manner. Preferably, a face wall of the housing supports a slider contact ring and a concentrically arranged annular resistor, the contact ring and the resistor being bridged by the rotatable slider which is secured to a supporting disk, the latter being coupled to the output member of the reduction gear assembly taking place in the remaining part of the housing. The aforementioned face wall is shaped as a cover of the housing.

According to another feature of the invention a particularly space saving arrangement of the reduction gear assembly is attained when the latter has a central sleeve inserted on the driving shaft of the servomotor and being shaped with an eccentric portion upon which a spur gear is rotatably supported to engage internal teeth of a ring gear which is formed on the inner wall of the jacket of the housing and has a larger diameter than that of the spur gear. The central sleeve further supports for rotation a drive disk provided with openings into which project carrier pins formed on the face of the spur gear. The drive disk that forms the output member of the gear, is provided on its periphery with a V-shaped groove into which slidably engage resilient tongues of the slider supporting disk of the potentiometer so that the rotary movement of the spur gear is imparted via the drive disk to the supporting disk. Since it is required to make use of the maximum displacement of the seat and since the adjustable range of a rotary potentiometer is at best of about 300°, a relatively large reduction ratio is necessary for reducing a large number of rotations of the servomotor to the limited range of movement of the potentiometer. For this reason, according to another feature of this invention, the diameter of the crown circle of the spur gear is smaller at least about the height of one tooth than the diameter of the root circle of the internal gear ring whereby the number of teeth of the spur gear and of the internal gear ring differ by at least about one tooth and the eccentricity of the eccentric portion of the central sleeve corresponds approximately to the difference between the radius of the root circle of the internal gear ring and the radius of the crown circle of the spur gear.

In order to avoid disturbances which might occur during the rotation of the servomotor on the drive disk carrying the slider supporting disk of the potentiometer, the drive disk which is connected for joint rotation with the spur gear, is coupled to the supporting disk preferably by means of a frictional coupling. This frictional coupling according to still another feature of this invention is formed with advantage in a very simple manner by a V-shaped peripheral groove in the drive disk. The groove slidably engages resilient tongues projecting laterally from the slider supporting disk, the latter being further provided with a stop lug.

To ensure that the internal gear ring which engages the spur gear rotatably supported on the eccentric portion driven by the motor shaft, be stationary relative to the motor shaft, the side walls of the housing of the potentiometer-reduction gear unit are provided respectively, with a laterally projecting retention pin. These retention pins are spaced about an equal distance from the center axis of the housing and one of the pins engages a corresponding recess in the wall of the motor assembly.

According to still another feature of this invention the front wall of the housing forming the housing cover is provided with an inwardly directed stop lug which cooperates with a radially directed stop finger on the slider supporting disk to limit the rotary movement of the latter. The stop lug in the housing cover is provided with a connector for conductors connected, respectively, to the slider contact ring and to the resistor ring of the potentiometer. These conducting wires are preferably embedded in the stop lug and their end portions project outwardly from the housing cover to serve as a plug for receiving a socket of the connector.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
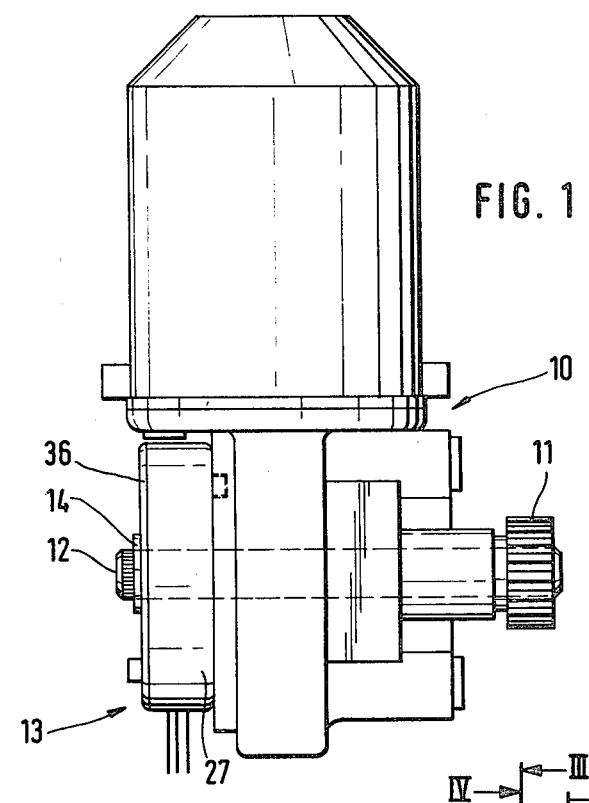
FIG. 1 is a side view of a servomotor with a potentiometer-reduction gear unit according to this invention.
Figure 2:
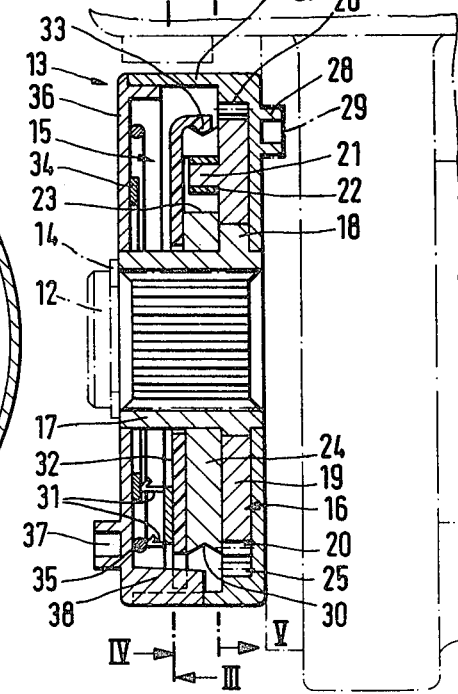
FIG. 2 shows on an enlarged scale a sectional side view of the potentiometer-reduction gear unit of FIG. 1 in connection with the schematically indicated portion of the motor.
Figure 3:
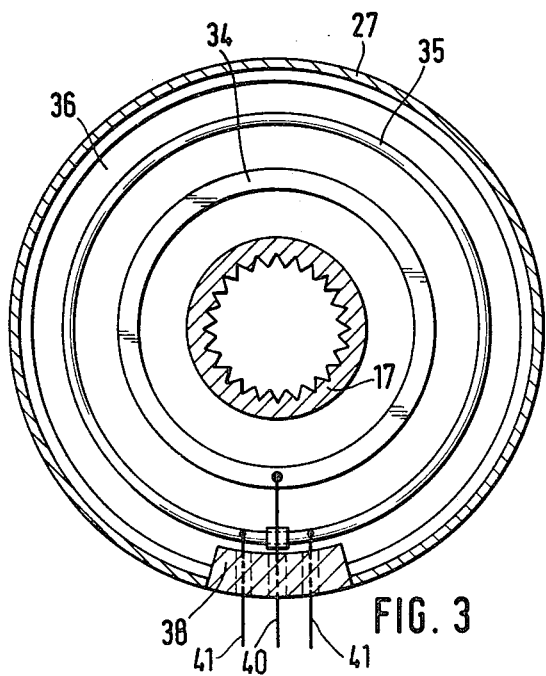
FIG. 3 is a sectional front view of the potentiometer-gear unit of this invention taken along the line III—III of FIG. 2.
Figure 4:
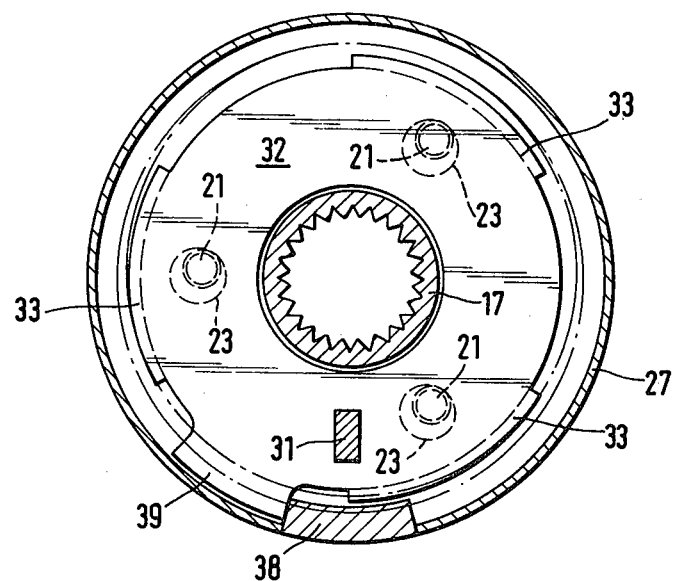
FIG. 4 is a sectional front view of the potentiometer-reduction gear unit of this invention taken along the line IV—IV of FIG. 2.
Figure 5:
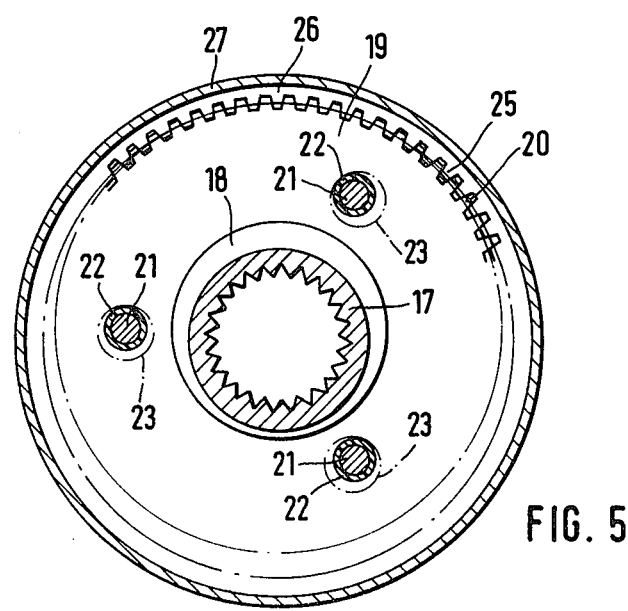
FIG. 5 is a sectional front view of the unit of this invention taken along the line V—V of FIG. 2.

The geared motor 10 illustrated in FIG. 1 is provided with a worm gear for driving a position adjuster of a backrest or the position adjuster of a seat portion of a nonillustrated motor vehicle seat. The adjustment drive is effected by means of driving pinion 11 on one end of the shaft of the worm gear. The other end portion 12 of the shaft supports a potentiometer-reduction gear unit 13 which is secured against axial movement on the shaft butt 12 by means of retaining ring 14. The structural unit 13 is assembled of a rotary potentiometer 15 and of a reduction gear 16 for reducing the rotational speed of the geared motor 10. The reduction gear 16 according to this invention is a wobble gear mechanism including a sleeve 17 supported on the shaft 12 or connected thereto for joint rotation by means of splines. The sleeve 17 is formed with an eccentric portion 18 upon which a spur gear 19 is supported for free rotation. The adjoining concentric portion of the sleeve 17 supports for rotation a drive disk 24 which is coupled to the spur gear 19 by means of carrying pins 21 projecting laterally from the latter and engaging elastic rings 22 disposed in bores 23 in the drive disk 24. The external teeth 20 of the spur gear 19 are in mesh with the internal teeth 25 of the stationary gear ring 26. In the shown embodiment, the gear ring 26 is an integral part of a pot-shaped housing part 27 (FIG. 2) which is slidably supported on the concentric portion of the sleeve 17 at the outer side of the eccentric 18. The housing part 27 is provided on its side wall with a retaining pin 28 projecting at a distance from the center axis of the sleeve 17 and engaging a recess 29 in the adjoining side wall of the geared motor 10 so that the housing part 27 of the potentiometer reduction gear unit 13 is fixed against rotation. The drive disk 24 which forms the output member of the reduction gear assembly is provided on its periphery with a V-shaped groove 30 which serves for frictionally engaging slider supporting disk 32 which in turn is connected to a bridge-shaped slider 31 of the potentiometer 16. The slider supporting disk 32 has three resilient tongs 33 uniformly distributed on its periphery and slidably engaging the V-shaped groove in the driving disk 32 thus forming with the latter a frictional coupling. The slider 31 electrically connects the contact ring 34 to the ring-shaped resistor 35. Both the contact ring 34 and the annular resistor 35 are concentrically attached on the cover part 36 of the housing forming the other end wall of the potentiometer-reduction gear unit. The housing cover 36 is also loosely supported on the concentric portion of the sleeve 17 and is rigidly connected to the housing part 27 so that both the potentiometer 15 and the reduction gears 16 are encapsulated in the assembled housing parts 27 and 36. The housing cover 36 is also provided with a retention pin 47 which is spaced from the center axis of the sleeve 17 about the same distance as the other retention pin 28 on the housing part 27. Due to this symmetrical arrangement of the retaining pins 28 and 37 it is irrelevant whether the potentiometer-reduction gear unit is mounted on the shaft 12 in a position in which the cover 36 faces the wall of the motor 10 or whether the housing part 27 adjoins the motor. The rim of housing cover 36 is formed with a stop lug 38 projecting axially into the housing part 27 and cooperating with a stop finger 39 which projects radially from the slider supporting disk 32 to limit the rotary movement of the latter. In this manner the range of rotation of the slider supporting disk 32 and thus of the slider 32 is limited to an angle of approximately 300°. The stop lug 38 also serves for mounting the current conductors 40 and 41 connected respectively to the contact ring 34 and to the ring-shaped resistor 35. The conductors 40 and 41 can be for example embedded in the lug 38 whereby their end portions project outwardly to serve as terminal pins engageable with a connection piece of a cable leading to a microprocessor.

The driving pinion 11 has to perform a large number of rotations to displace the adjuster of the backrest or of the seat part over its entire adjustment range whereas the supporting disk 31 with its slider 32 has to rotate about a circular path which corresponds to a rotary angle of approximately 300°. For this reason a considerable reduction between the number of rotations of the driving shaft 12 and of the potentiometer is required. For this purpose, in the shown embodiment of the reduction gears the diameter of the crown circle of the spur gear 19 is at least about the height of one tooth less than the diameter of the root circle of the internal gear ring 26. A maximum reduction is attained when the number of teeth of the spur gear 19 differs from that of the internal gear ring 26 about one tooth only. The selection of the maximum number of teeth depends from case to case on the required reduction ratio. At the same time the eccentricity of the eccentric portion 18 of the sleeve 17 corresponds approximately to the difference between the radius of the root circle of the internal gear ring 26 and the radius of the crown circle of the spur gear 19. At one full rotation of the sleeve 17 the spur gear 19 rotates with a wobbling movement over a sector of about one tooth. This reduced rotation corresponding to the sectional angle of one tooth is transmitted to the driving disk 24. In order to give way to the wobbling movement of the spur gear 19, the borings 23 in the driving disk 24 have a diameter which is larger about the double eccentricity of the eccentric portion 18 than the outer diameter of the elastic rings 22 which are arranged on the carrier pins 21.

As soon as the seat is adjusted to a position which is comfortable to the user, slider 31 is moved to a definite position on the annular resistor 35 corresponding to a definite voltage division on the potentiometer. This partial voltage is applied as a measured value to a microprocessor where it is stored so that upon the change of the position of the seat it is always possible to recall the stored value and restore the originally adjusted position of the seat.

It will be understood that each of the elements described above, or two or more together, may also find a useful application in other types of constructions differing from the types described above. For instance, it is possible to replace the slip-on sleeve 17 by an eccentric bolt which projects laterally from the potentiometer-reduction gear unit and is coupled to the driving motor. In another modification, the potentiometer-reduction gear unit can have a unilaterally open housing inserted on a matching flange provided on the wall of the motor. Moreover, it is also possible to replace the planetary wobble gears described in the preferred embodiment by a spur gear train or by worm gears.

While the invention has been illustrated and described as embodied in a specific example of the potentiometer-reduction gear unit for use with power driven seat adjusters, it is not intended to be limited to the details shown, since various modifications and structural changes may be made without departing in any way from the spirit of the present invention.

What is claimed as new and desired to be protected by Letters Patent is set forth in the appended claims:

1. In a power driven adjustable seat, particularly a motor vehicle seat having a position adjuster including a servomotor with a driving shaft, a potentiometer coupled to the driving shaft via reduction gears, and an electronic data processing and storing device electrically connected between the potentiometer and the servomotor to store and process the measured value delivered by the potentiometer and to control the position of the seat via the servomotor, a combination comprising
a housing common both to said potentiometer and said reduction gears, the said reduction gears having an input member coupled to said driving shaft and also having an output member; and
said potentiometer having a rotary slider coupled to said output member.

2. The combination as defined in claim 1 wherein said common housing includes a gear housing part associated with said reduction gears and a cover part associated with said potentiometer.

3. The combination as defined in claim 2 wherein said potentiometer includes a contact ring and a ring-shaped resistor concentrically arranged on said housing cover, and said rotary slider being mechanically coupled to said reduction gear output member to bridge said contact ring and said ring-shaped resistor.

4. The combination as defined in claim 3 wherein said reduction gears include a slip-on sleeve attached for joint rotation to said shaft of the motor, said sleeve defining a concentric portion and an eccentric portion forming said input member; a spur gear supported for rotation on said eccentric portion; an internal gear ring formed on the inner wall of said gear housing part and having its internal teeth in mesh with the external teeth of said spur gear; said output member being in the form of a driving disk supported for rotation on said concentric portion of said sleeve and being provided with axially directed bores; and carrier pins projecting laterally from said spur gear into said axial bores to transfer the rotary movement of said spur gear to said driving disk.

5. The combination as defined in claim 4 further comprising resilient rings arranged in said bores around said carrier pins.

6. The combination as defined in claim 4 wherein the diameter of the crown circle of the spur gear is smaller at least about the height of a tooth than the diameter of the root circle of the internal gear ring; the number of teeth of the spur gear and of the internal gear ring differing at least about one tooth; and the eccentricity of the eccentric portion of the sleeve corresponding approximately to the difference between the radius of the root circle of the internal gear ring and the radius of the crown circle of the spur gear.

7. The combination as defined in claim 4 wherein said potentiometer includes a slider supporting disk slidably coupled to said driving disk.

8. The combination as defined in claim 7 wherein said driving disk includes a peripheral groove; and said slider supporting disk being provided on its periphery with resilient tongues adapted for slidably engaging said groove to form a frictional coupling therewith.

9. The combination as defined in claim 7 wherein said slider supporting disk includes a radially projecting stop finger and said housing cover is provided with an inwardly projecting stop lug cooperating with said stop finger to limit the rotation of said slider supporting disk.

10. The combination as defined in claim 9 wherein said stop lug supports end portions of conduits connected to said ring resistor and to said contact ring.

11. The combination as defined in claim 9 wherein said stop lug supports means for connecting said processing and storing device.

12. The combination as defined in claim 1 wherein said common housing has two opposite faces, each of said faces being formed with an axially projecting retaining pin each being about an equal distance from the central axis of the sleeve and being engageable into a recess in the wall of said motor.

13. A power drive unit for a position adjuster of an adjustable seat, particularly a motor vehicle seat, comprising a servomotor with a driving shaft connectable to the adjuster; a potentiometer coupled to the driving shaft via reduction gears; an electronic data processing and storing device electrically connected between the potentiometer and the servomotor to store and process the measured value delivered by the potentiometer and to control the position of the seat via said servomotor; a housing common both to said potentiometer and said reduction gears; said reduction gears having an input member coupled to said driving shaft and also having an output member; and said potentiometer having a rotary slider coupled to said output member.

14. A drive unit as defined in claim 13 wherein said common housing includes a gear housing part associated with said reduction gears and a cover part associated with said potentiometer.

15. A drive unit as defined in claim 14 wherein said reduction gears are woble gears.

16. A drive unit as defined in claim 14 wherein said potentiometer includes a contact ring and a ring-shaped resistor concentrically arranged on said housing cover, and said rotary slides being mechanically coupled to said reduction gear output member to bridge said contact ring and said ring-shaped resistor.

17. A drive unit as defined in claim 16 wherein said rotary slider is coupled to said output member via a frictional coupling.

18. A drive unit as defined in claim 17 wherein said reduction gears include a slip-on sleeve attached for joint rotation to said shaft of the motor, said sleeve defining a concentric portion and an eccentric portion forming said input member; a spur gear supported for rotation on said eccentric portion; an internal gear ring formed on the inner wall of said gear housing part and having its internal teeth in mesh with the external teeth of said spur gear; said output member being in the form of a driving disk supported for rotation on said concentric portion of said sleeve and being provided with means for transferring the rotary movement of said spur gear to said driving disk, said driving disk and said rotary slider being mounted on a supporting disk formed with resilient tongues, said tongues slidably engaging said groove to form a frictional coupling therewith.

19. A drive unit as defined in claim 18, wherein said common housing has two opposite faces, each of said faces being formed with an axially projecting retaining pin each being about an equal distance from the central axis of the sleeve and being engageable into a recess in the wall of said motor.

20. A drive unit as defined in claim 18, wherein said slider supporting disk includes a radially projecting stop finger and said housing cover is provided with an inwardly projecting stop lug cooperating with said stop finger to limit the rotation of said slider supporting disk.

* * * * *